(No Model.)   3 Sheets—Sheet 1.

L. T. CORNELL.
GAS ENGINE.

No. 406,263.   Patented July 2, 1889.

Witnesses:
L. L. Boud
H. T. Jones

Inventor:
Lewis T. Cornell

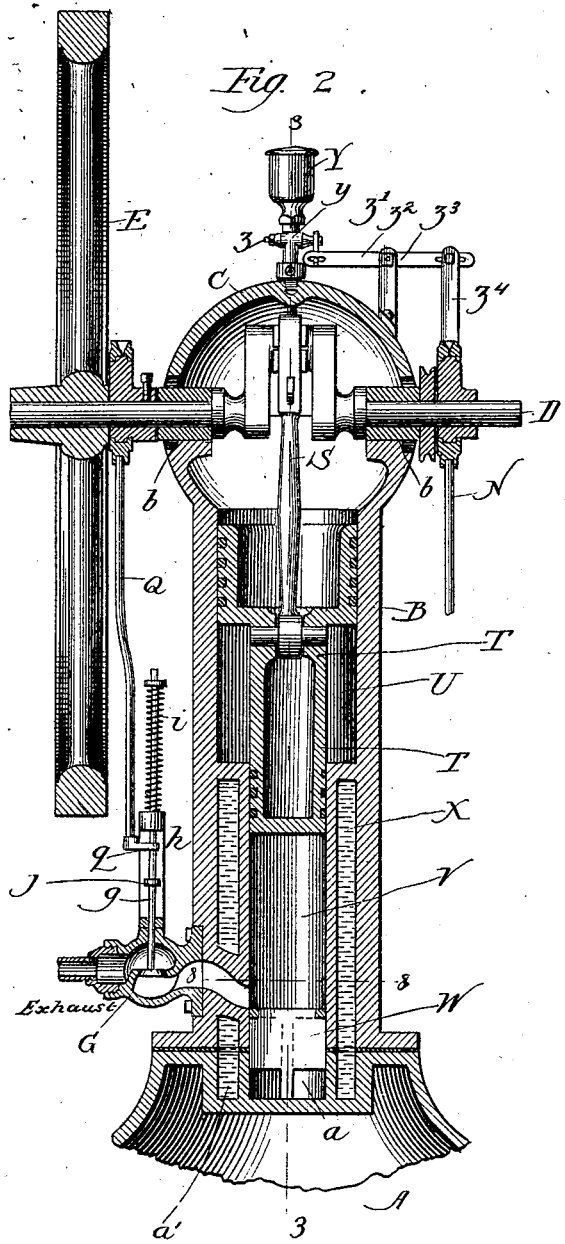
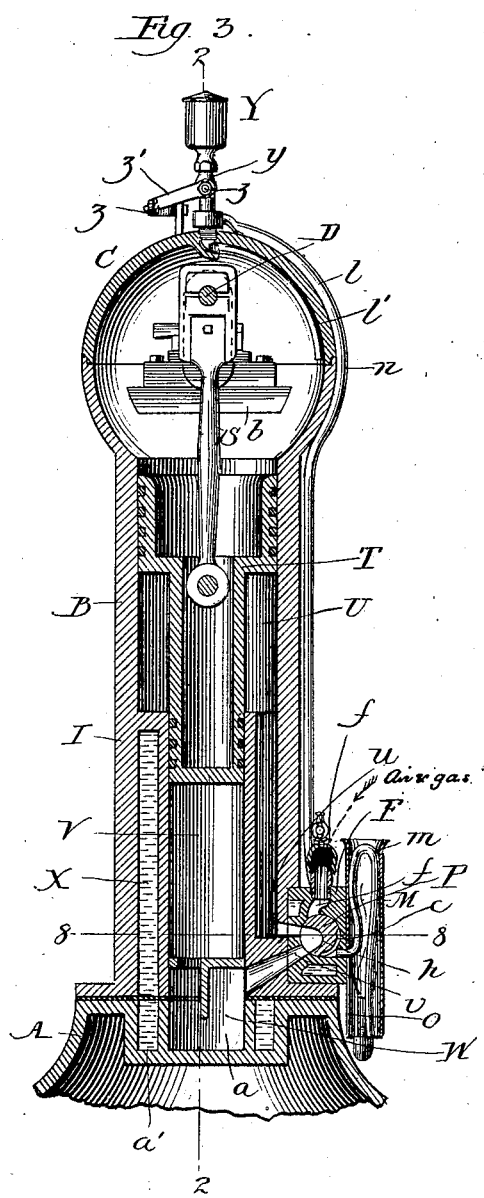

(No Model.) 3 Sheets—Sheet 3.

L. T. CORNELL.
GAS ENGINE.

No. 406,263. Patented July 2, 1889.

Witnesses:
L. L. Boud
H. T. Jones

Inventor:
Lewis T. Cornell

UNITED STATES PATENT OFFICE.

LEWIS T. CORNELL, OF CHICAGO, ILLINOIS, ASSIGNOR TO THE CORNELL ENGINE COMPANY, OF SAME PLACE.

GAS-ENGINE.

SPECIFICATION forming part of Letters Patent No. 406,263, dated July 2, 1889.

Application filed October 12, 1888. Serial No. 288,037. (No model.)

*To all whom it may concern:*

Be it known that I, LEWIS T. CORNELL, residing at Chicago, in the county of Cook and State of Illinois, and a citizen of the United States, have invented certain new and useful Improvements in Gas-Engines, of which the following is a specification, reference being had to the accompanying drawings, in which—

Figure 1:
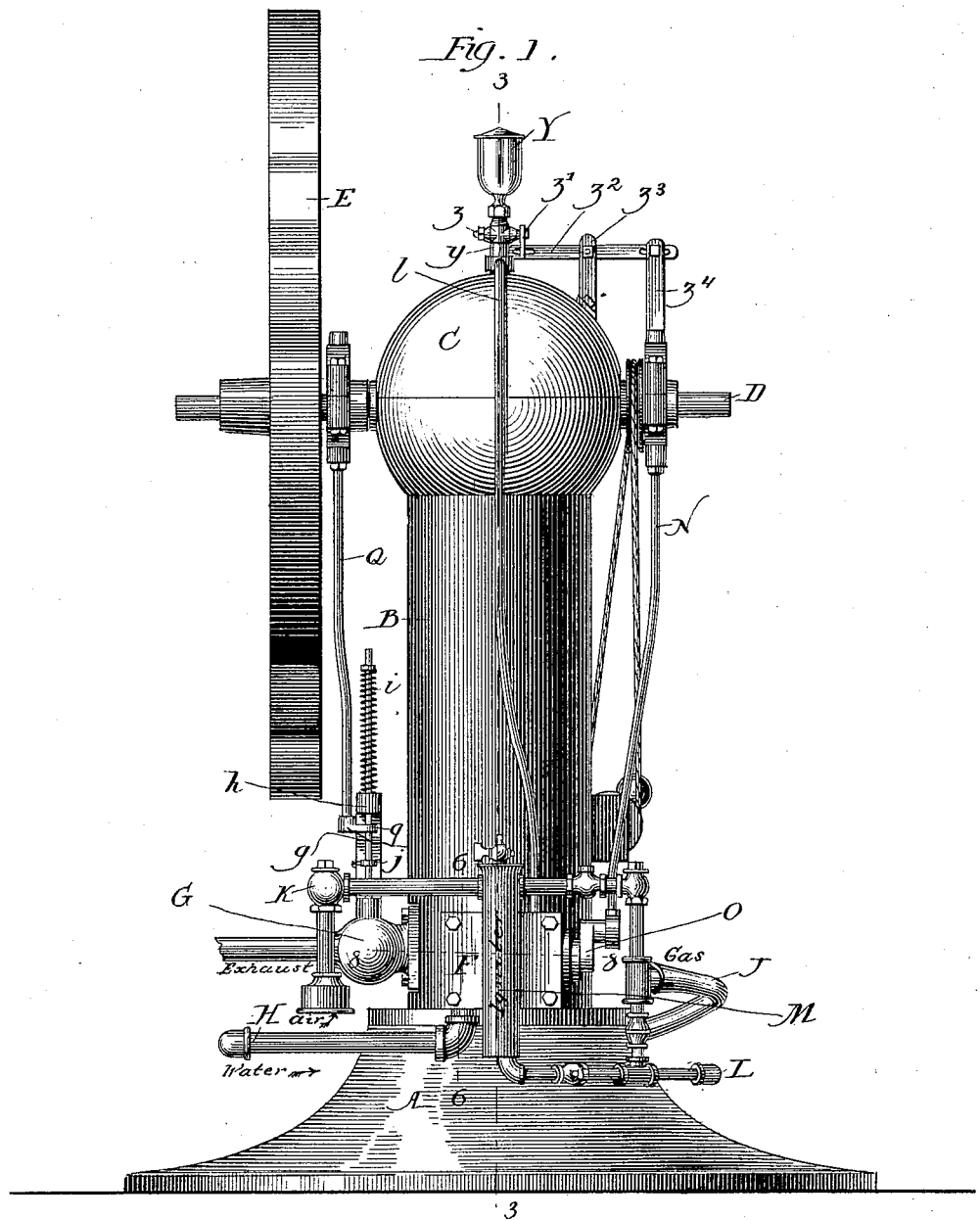
Figure 5:
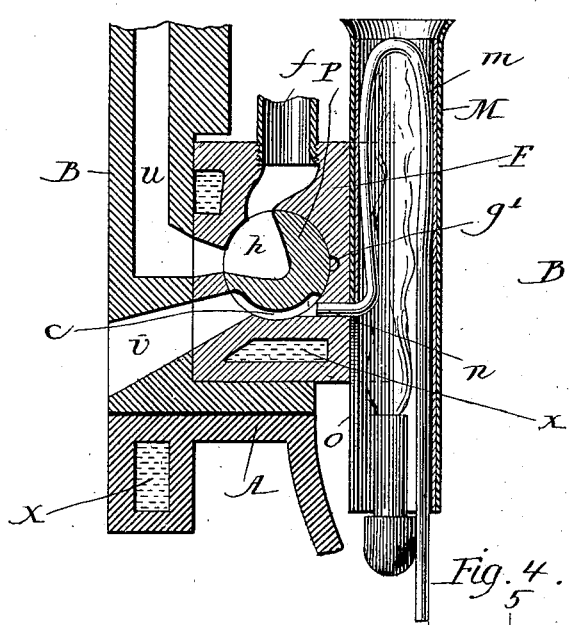
Figure 6:
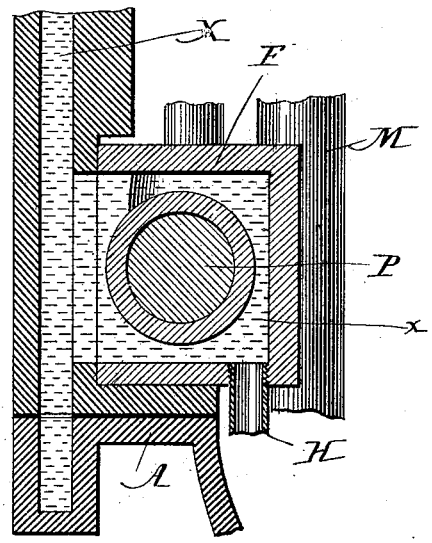
Figure 4:
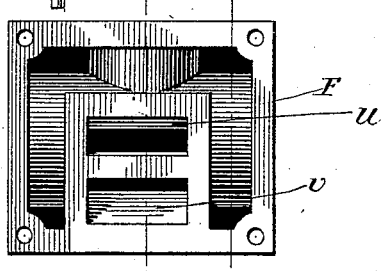
Figure 9:
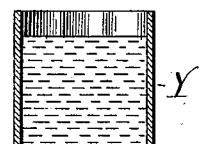
Figure 7:
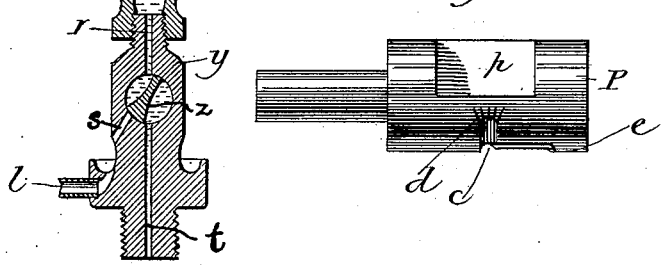
Figure 8:
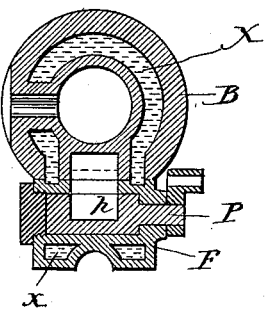

Figure 1 is a front elevation. Fig. 2 is a central vertical section at line 2 2 of Fig. 3. Fig. 3 is a central vertical section at line 3 3 of Figs. 1 and 2. Fig. 4 is an elevation of the inner side of the valve-chest removed from its position on the cylinder. Fig. 5 is an enlarged vertical section through one side of the cylinder and the valve-chest at lines 5 5 of Fig. 4 and 3 3 of Fig. 1. Fig. 6 is a similar view at line 6 6 of Figs. 1 and 4. Fig. 7 is an enlarged detail, being an elevation of the valve. Fig. 8 is a cross-section at line 8 8 of Figs. 1, 2, and 3, the discharge or eduction valve being removed. Fig. 9 is an enlarged detail, being a vertical section through the oil-cup.

This invention relates to that class of gas-engines in which an explosive mixture of gas and air is compressed and exploded within a cylinder to drive a piston-head, and is particularly designed to improve the construction and operation of the engine shown in Letters Patent No. 359,920, granted to me March 22, 1887.

The objects of my invention are to improve the construction and arrangement of the body or frame of the engine, to provide a jacket for the cylinder and valve-chest, to provide an improved induction-valve for the cylinder, to provide an improved device for operating the eduction-valve, to provide improved means for igniting the explosive mixture, to provide an improved oiling device, and to improve generally the operation and construction of gas-engines, which objects I accomplish as illustrated in the drawings and hereinafter described. That which I claim as new will be pointed out in the claims.

In the drawings, A indicates a base-plate; B, the cylinder; C, a hemispherical cap covering the upper end of the cylinder B; D, a crank-shaft; E, a fly-wheel; F, a valve-chest for the induction-valve; G, the eduction-valve; H, a pipe for supplying cool water to the water-space; I, a pipe for discharging water; J, a pipe for supplying gas to the valve-chest; K, a pipe for supplying air to the valve-chest; L, a pipe for supplying gas to the burner; M, a chimney for the burner; N, an eccentric and rod for operating the induction-valve; O, a crank-arm for rocking the induction-valve which is operated by the rod N; P, a rotary induction-valve; Q, an eccentric and rod for operating the eduction-valve; S, a piston or connecting rod; T, a piston-head; U, the compressing-chamber of the cylinder; V, the working-chamber of the cylinder; W, a pocket in the working-chamber V. X is a water-space, and Y is an oil-cup.

The base-plate A is cast in the form shown, with a central circular recess $a$ corresponding to the end of the working-chamber V of the cylinder. Around the circular recess is an annular recess $a'$, which corresponds to the water-space X of the cylinder B.

The cylinder B, Figs. 2 and 3, is cast in one piece, so as to have a compressing-chamber U of large diameter in its upper portion and a circular working or piston chamber V and annular water-space X around said chamber V in its lower portion. The upper end of the cylinder above the chamber U is of a larger diameter, and is hemispherical in form to receive the crank-shaft D. The cylinder can thus be cast in a single piece and finished in a lathe at a comparatively small cost. The crank-shaft D is mounted in two boxes, which are supported by flanges $b$ on opposite sides of the upper edge of the cylinder B. The upper end of the cylinder B is covered by a hemispherical cap C, which protects the working parts from dust and dirt and prevents the oil from being thrown or spattered by the rapid movements of the piston and crank, so that the engine can be used in any room without soiling or injuring its surroundings.

The piston-head T, as in my former patent, has two parts of different diameters, which work in the two chambers U and V.

The gas from the supply-pipe J and the air from the pipe K are admitted, mixed together, to the valve P through a port $f$ in the valve-chest F. The rotary valve P is seated in the chest F, so that it will open communication from the port $f$ through its recess $p$ into the port and passage $u$, which leads to the compressing-chamber U, (see Fig. 5,) and when it is rotated to the position shown in Fig. 3 by the eccentric and rod N and lever or crank arm O it closes the port $f$ and opens communication from the port $u$ through its recess $p$ and a port $v$ into the pocket W in the working-chamber V, the piston-head T by its descent compressing the gas and forcing it through the valve P into the working-chamber V, as in my former patent. When the piston is at its lower limit of stroke, the valve P is rotated backward, closing communication through it between the compressing-chamber U and working-chamber V, and bringing an ignition-slot $c$ on the periphery of the valve into communication between the port $v$ and a pipe $m$, the end of which is secured in the valve-chest F, and which is heated sufficiently to explode the gas by a Bunsen burner on the pipe L in the chimney M. The gas in the slot $c$, which is ignited by the heated pipe $m$, explodes the gas in the working-chamber V. As the products of the explosion are left in the slot $c$, the valve P is provided with small grooves $d$, which, when the valve rotates backward, permit fresh gas from the new charge passing into the working-chamber to pass into the slot $c$, thereby forcing the products of the previous explosion out of the slot $c$ through a longitudinal slot $e$ in the valve P and a port $g'$ in the chest F into the open air. The port $e$ and grooves $d$ are located in the valve P, so as to allow the passage of the products of each explosion and gas at the proper instant, to insure the filling of the ignition-slot $c$ with a fresh supply of the explosive gas at the instant communication is opened for the explosion into the working-chamber V.

The pipe $m$ is bent into a loop in the form shown in Figs. 3 and 5, so that it will be heated uniformly by the burner a sufficient length to insure regular explosions, and its lower end is extended down through the chimney M below the burner, so that its lower end will remain cool, and thereby maintain the proper action of the pipe $m$. The pipe $m$ is held in position by screwing its end into a screw-threaded opening $n$ in the chest F, its lower end being open to the air. The chimney M is slipped down over the pipe $m$, a slot $o$ in the chimney M allowing it to pass over far enough to surround the burner and secure the chimney in place. The products of combustion after each explosion are discharged through the eduction-valve G. This valve G seats upward, and its stem $g$ extends upward through a bracket $h$. The stem $g$, above the bracket $h$, is surrounded by a spring $i$, which presses upward against a button on the upper end of the stem $g$, holding the valve seated. The lower end $q$ of the eccentric-rod Q slides on the stem $g$, and strikes a button $j$ on the stem $g$, opening the valve G, when the eccentric-rod Q descends and allows the spring $i$ to close the valve G when the rod Q ascends. The eccentric Q is adjusted on the shaft D to open the valve G at the proper time for the discharge of the products of combustion after each explosion, and allows the spring $i$ to close the valve at the proper time to prevent the escape of any of the fresh gas. The button $j$ is adjustable on the stem $g$. The pocket W receives the fresh gas, and the vertically-depending plate prevents the mingling of the fresh gas with the products of the previous explosion.

The water-space X is formed in the cylinder B when the cylinder is cast, and corresponds to the annular recess $a'$ in the base-plate A. This space also has communication with a water-space $x$ in the valve-chest F. Cool water is supplied to the space X through the pipe H, and the heated water is discharged through the pipe I, thereby keeping a supply of cool water around the working-chamber and the valve to prevent overheating of these parts from the heat of the explosions.

For the purpose of preventing the machine from running dry, avoiding close attention on the part of the operator to the oiling of the piston or of the valve P, which is liable to become heated by the explosions, and oiling according to the speed at which the engine is run, I provide the oil-cup Y. This cup Y is connected with the cap C, on which it is most conveniently located, by a tube or support $y$, which is provided with a longitudinal opening or pipe $t$ and a side opening $s$, which permits oil to drip into a groove or trough surrounding the support $y$. The stem or support $y$ is provided with a rocking valve $z$, which is cut away at the sides, as shown in Fig. 9, so as to permit oil to alternately escape into the passages $s$ and $t$, the inlet $r$ from above being closed at the times when the passages $s$ and $t$ are opened, thereby permitting the escape of a very little oil on each movement of the valve $z$, and preventing the escape of the oil when the engine is at rest. The oil that flows out of the passage $s$ is conducted by the pipe $l$ down to the valve-chest F for lubricating the valve P, and that which flows through the passage $t$ is conducted by the pipe $l'$ down the inside of the cap C, as shown in Fig. 3, so as to lubricate the piston T. The valve $z$ is rocked or operated by the crank-arm $z'$, lever $z^2$, which is pivoted at $z^3$, and the pitman $z^4$, which is driven by the eccentric N. By this arrangement only so much oil flows or escapes at each movement as adheres to the valve ports or passages $s$ and $t$, and the entire flow is dependent on the rapidity with which the engine runs. The crank-shaft D and its bearings may be lubricated in any of the usual and well-known ways. This oiling device is especially designed for use with this gas-engine, as other devices for oiling the piston and valve are found inapplicable to the engine, which requires oiling according to the work done and requires oiling at the proper point above the piston to insure a uniform distribution of the oil.

What I claim as new, and desire to secure by Letters Patent, is—

1. In a gas-engine, the combination of the base A, having a central circular recess $a$ and a concentric annular recess $a'$, the cylinder B, having a working-chamber V corresponding to and extended into the recess $a$, and a water-space X, corresponding to the annular recess $a'$, and an induction-valve having a valve-chest provided with a water-space $x$, that communicates with the water-space of the cylinder, substantially as described.

2. In a gas-engine, the cylinder B, cast or formed in a single piece, having a central working-chamber V, provided at its lower end with a pocket W, a water-space X, surrounding the working-chamber, a compressing-chamber U of large diameter above the working-chamber and water-space, and a hemispherical upper end provided with bearings for a crank-shaft, substantially as described.

3. In a gas-engine, the combination, with a cylinder B, having a compressing-chamber U, provided with a port $u$, and a working or explosion chamber V, provided with a port $v$, of a valve-chest containing a rotary valve having recess $p$ and peripheral ignition-slot $c$, and an igniting device, substantially as described.

4. In a gas-engine, a cylinder having ports $u$ and $v$, in combination with a valve-chest containing a rotary valve having a recess $p$, an ignition-slot $c$, and grooves $d$, communicating with said slot, and a discharge-passage $g'$ from the valve to the open air, substantially as and for the purpose specified.

5. In a gas-engine, the combination of a solid induction-valve having an ignition-groove on its periphery, a valve-chest having groove $g'$, a pipe $m$, attached to the valve-chest and communicating with the ignition-groove of the valve, and a burner for heating said pipe, substantially as described.

6. In a gas-engine, the combination of the induction-valve chest, a pipe $m$, bent to form a loop and screwed into the valve-chest at one end and open at the other, a burner for heating said pipe, and a valve having an ignition-groove on its periphery, substantially as described.

7. In a vertical gas-engine, the combination, with the eduction-valve having a vertical stem $g$, provided with adjustable button $j$, of the bracket $h$, the spring $i$ on the valve-stem, and the rod Q, depending from an eccentric on the engine crank-shaft and having its lower end connected with the valve-stem above the button $j$, substantially as described.

8. In a vertical gas-engine, the combination, with the cylinder B, having the compression-chamber U, provided with port $u$, the explosion-chamber V, provided with port $v$, the piston T, located in said chambers, and the induction-valve chest F, having inlet-port $f$ and a rotary induction-valve P, provided with recess $p$ and peripheral ignition-slot $c$, of the pipes $l$ and $l'$, located on the outside and inside of the cylinder, respectively, and one leading to the induction-valve chest and the other to the piston from an oil-cup located above the cylinder, substantially as described.

LEWIS T. CORNELL.

Witnesses:
 L. L. BOND,
 H. T. JONES.